(No Model.)

J. S., B. T., W. O. & C. C. DUFFY.
ROTARY GRAIN METER.

No. 412,076. Patented Oct. 1, 1889.

Witnesses:
E. P. Ellis
J. M. Nesbit

Inventors.
Jno. S. Duffy,
B. T. Duffy,
W. O. Duffy,
C. C. Duffy,
per H. A. Lehmann

UNITED STATES PATENT OFFICE.

JOHN S. DUFFY, BRANNOCK T. DUFFY, WILLIAM O. DUFFY, AND CHARLIE C. DUFFY, OF MOOREFIELD, NEBRASKA.

ROTARY GRAIN-METER.

SPECIFICATION forming part of Letters Patent No. 412,076, dated October 1, 1889.

Application filed May 18, 1889. Serial No. 311,207. (No model.)

*To all whom it may concern:*

Be it known that we, JOHN S. DUFFY, BRANNOCK T. DUFFY, WILLIAM O. DUFFY, and CHARLIE C. DUFFY, of Moorefield, in the county of Frontier and State of Nebraska, have invented certain new and useful Improvements in Grain-Weighing Machines; and we do hereby declare the following to be a full, clear, and exact description of the invention, such as will enable others skilled in the art to which it pertains to make and use it, reference being had to the accompanying drawings, which form part of this specification.

Our invention relates to an improvement in grain weighing and measuring machines; and it consists in the combination of a suitable frame-work provided with stationary catches, a revolving vertically-moving measuring device, which is divided into four chambers and provided with ratchets upon its edge to engage with the catches, a pivoted frame in which the measuring device is journaled, a shaft connected to the pivoted frame by a cord or belt, a drum placed upon the shaft, and a counter-weight connected to the drum for the purpose of raising the frame and the measuring device, all of which will be more fully described hereinafter.

The object of our invention is to journal the measuring device in a pivoted frame, so that when all of the chambers of the measuring device are empty the frame and measuring device will rise and become locked in position until the regulated amount of grain has been run into one of its chambers, when the parts sink and allow the measuring device to revolve to empty the chamber which has been filled and to bring another one into position.

Figure 1:
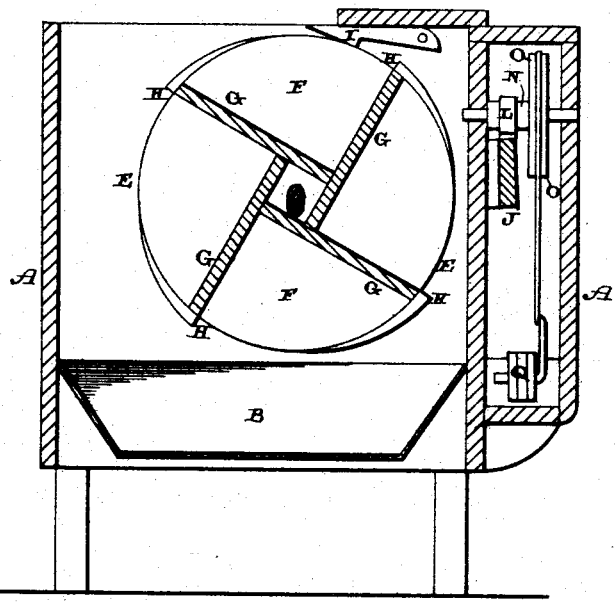
Figure 2:
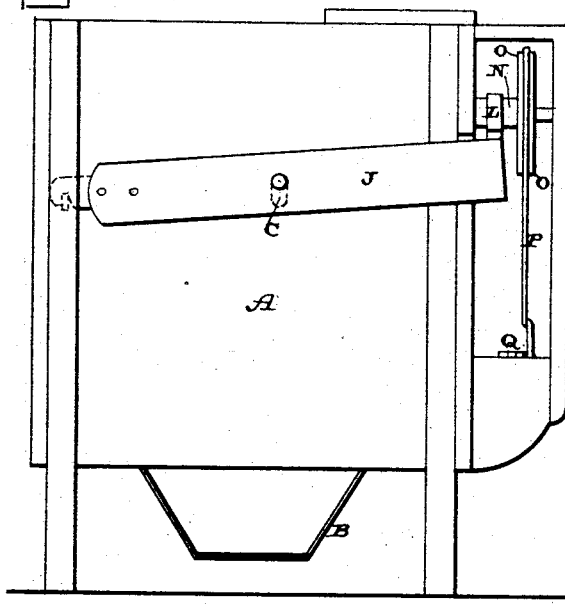
Figure 3:
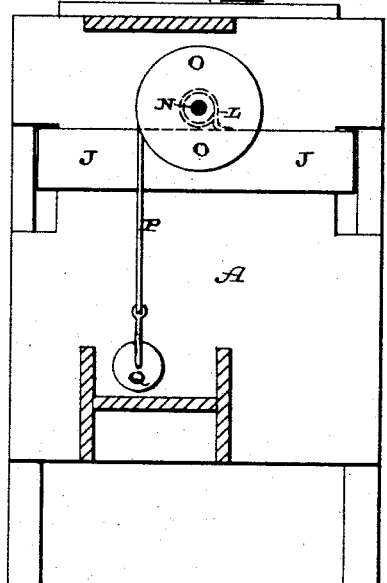

Figure 1 is a longitudinal vertical section of a machine which embodies our invention. Fig. 2 is a side elevation of the same. Fig. 3 is an end view, a portion of the frame-work being removed.

A represents a suitable frame-work of any desired shape, size, or construction which may be desired, and which is almost wholly open at its top, so as to allow the grain to flow freely in from any desired source, and which has its bottom formed of a piece of sheet-iron B, which is shaped so as to form a spout and run the grain either into a wagon, bags, or any other receptacle placed to receive it. Through opposite sides of this frame are made the slots C, through which the journals of the measuring device E pass and through which they have a vertical movement.

The measuring device C is provided with round end pieces F, and in between these end pieces are placed the partitions G, by means of which the measuring device is divided into four chambers. We do not limit ourselves to this precise number, for the number can be increased or decreased at will; but we prefer to use four, as here shown. Upon the outer edges of these round pieces F are formed the stops or ratchets H, which alternately engage with the stops I, arranged in opposite sides of the upper portion of the frame A. When the journals of the measuring devices sink downward in the slots C, these stops or ratchets H are moved out of contact with the stops I, and then the weight of the grain in the chamber causes it to partially revolve. This measuring device sinks whenever a certain regulated amount of grain has been run into one of the chambers, and as soon as this grain is discharged the measuring device is raised so as to bring the stops or ratchets in contact with the stops I. The journals of the measuring device have their bearings in the frame J, which is pivoted at its front end upon suitable bearings provided for it, and the free end of this frame J is connected by a strap or cord L with the shaft N, which is journaled in suitable bearings prepared for it. Secured to this shaft N is a drum or pulley O, around which the cord P passes and which cord has a suitable weight Q secured to its lower end. This weight Q is varied from time to time, according to the quantity of grain which is to be measured at each operation. This weight Q serves to turn the shaft N, so that the cord or belt L will be wound around the shaft N, and thus raise the free end of the frame J, so as to lift the measuring device and bring the stops in contact with the catches I. The weight Q is regulated according to the quantity of grain which is to be run into each one of the chambers, and when this regulated quantity has been received in the chamber the measuring device and the frame J sink downward, wrapping the cord or chain P upon the sheave O, and thus unwinding the cord or belt L, so as to allow the free end of the frame J to sink with the measuring device. As soon as the grain is discharged, the weight Q instantly draws the frame J back into position, carrying the measuring device with it.

Connected to the frame A will be any suitable registering mechanism, which will be operated by the movements of the frame J and devices attached thereto for that purpose.

Our machine is especially designed to set on the top of the separator and to receive the grain from the elevator, weigh, register, and dump it into a wagon, thereby saving the labor of two men.

This machine is also adapted for weighing grain from an elevator in loading vessels.

Having thus described our invention, we claim—

The combination of the frame A, provided with the slots C, the rotating weighing device divided into chambers and provided with stops H, stationary stops I, placed in the frame, the pivoted frame J, in which the weighing device is pivoted and by which the device is given a vertical movement, the strap L, secured to one end of the frame J, the shaft N, around which the upper end of the strap is wound, the drum O, secured to the shaft, cord P, and weight Q, substantially as shown.

In testimony whereof we affix our signatures in presence of two witnesses.

JOHN S. DUFFY.
BRANNOCK T. DUFFY.
WILLIAM O. DUFFY.

Witnesses:
HENRY MONTGOMERY,
JOHN SCOTT.

CHARLIE C. DUFFY.

Witnesses:
FRED SKINNER,
BRANNOCK P. WILSON.